(12) United States Patent
Alkelaibi et al.

(10) Patent No.: US 12,289,337 B2
(45) Date of Patent: Apr. 29, 2025

(54) SYSTEM, METHOD, AND APPARATUS FOR IMPROVED MANAGEMENT OF SECURITY VULNERABILITIES IN A COMPUTING SYSTEM USING A MACHINE LEARNING MODEL

(71) Applicant: SAUDI ARABIAN OIL COMPANY, Dhahran (SA)

(72) Inventors: Naif A Alkelaibi, Dhahran (SA); Abdulrahman Mamoun Naffaa, Dammam (SA); Faraj R Ajmi, Dammam (SA); Yasser A Gahtani, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 199 days.

(21) Appl. No.: 18/322,298

(22) Filed: May 23, 2023

(65) Prior Publication Data

US 2024/0396921 A1 Nov. 28, 2024

(51) Int. Cl.
  *H04L 9/40* (2022.01)
(52) U.S. Cl.
  CPC ................. *H04L 63/1433* (2013.01)
(58) Field of Classification Search
  CPC ........... H04L 63/1433; H04L 63/1441
  See application file for complete search history.

(56) References Cited

U.S. PATENT DOCUMENTS

| | | | |
|---|---|---|---|
| 8,266,703 B1* | 9/2012 | Magdych | H04L 63/1433 726/25 |
| 2012/0185944 A1* | 7/2012 | Abdine | G06F 21/577 726/25 |
| 2013/0104236 A1* | 4/2013 | Ray | H04L 63/20 726/25 |

FOREIGN PATENT DOCUMENTS

GB 2587820 A 4/2021

* cited by examiner

*Primary Examiner* — Clayton R Williams
(74) *Attorney, Agent, or Firm* — Leason Ellis LLP

(57) ABSTRACT

A system and method of processing data on detected vulnerabilities using a learning vulnerability processing model to generate refined vulnerability data that excludes one or more of a false positive finding, a repeated item, and an inaccurate finding assignment, the learning vulnerability processing model being trained and evaluated using a task component that outputs one or more evaluation processes for a corresponding one or more processed vulnerability records and a performance measurement component that executes the one or more evaluation processes to output one or more evaluation metrics, the one or more evaluation metrics comprising a comparison metric for a comparison between respective one or more potential error indicators in the raw vulnerability data and corresponding one or more vulnerability type classifications using the learning vulnerability processing model.

14 Claims, 4 Drawing Sheets

SYSTEM, METHOD, AND APPARATUS FOR IMPROVED MANAGEMENT OF SECURITY VULNERABILITIES IN A COMPUTING SYSTEM USING A MACHINE LEARNING MODEL

FIELD OF THE DISCLOSURE

The present disclosure generally relates to a computer-implemented automatic vulnerability detection and management process for a computing system and, more specifically, to an improved system for automatically prioritizing detected security vulnerabilities for reporting.

BACKGROUND OF THE DISCLOSURE

The Information Technology (IT) industry continues to rapidly evolve, with numerous technological solutions being introduced continuously. Each solution brings risks to cybersecurity by introducing any number of unique threats that relate to the way it operates. One of the mitigation methods is to scan systems for vulnerabilities. However, with the proliferation of the number of systems that need to be managed by any one entity, such scanning requires substantial resources. As such, it can be difficult to maintain each system and manage their respective vulnerabilities. Related to this problem is the concurrent proliferation of software code and the attendant vulnerabilities that they can present. In view of these problems and the developments in machine learning (ML) processes, tools employing ML have been proposed for addressing large volume tasks, such as software code analysis.

United Kingdom (UK) Patent Application Publication No. GB2587820 describes using a machine learning (ML) method to detect security vulnerabilities in a source code. The method includes detecting security vulnerabilities using static code analysis (SCA), library analysis during compilation, and ML analysis. A ML post analysis module then conducts post analysis on the vulnerabilities detected using the SCA, library analysis, and ML analysis to predict a final security vulnerability. The method further includes providing a first input from a security expert on the final security vulnerability as training data to train the ML post analysis model and to improve its accuracy of predicting the presence of vulnerabilities within the source code.

SUMMARY OF THE DISCLOSURE

The present disclosure is directed to an improved ML-based technique to refine and enhance the detection and management of systemwide vulnerabilities by comparing and intelligently updating a vulnerability database.

It is recognized that varied scanning tools for detecting vulnerabilities can generate results in different formats. Thus, for large operating entities with a high number of systems, vulnerability reports can become ambiguous—with different formats that can produce false positive findings, repeated findings, inaccurate assignments, and the like. Accordingly, a ML training feed methodology is disclosed that retrieves multiple vulnerability types from a multitude of sources. A collection of raw vulnerabilities is categorized into respective data sets. In one example implementation, the collection is sorted into three (3) data sets: false positive findings, repeated items, and inaccurate findings assignment. The data sets are used as training data. Each set is used for separate training and then combined by another process to obtain improved outcomes.

In present disclosure, the machine learning model is trained using a mathematical model from past vulnerability data fed into a task component and evaluated through a performance measurement component.

According to an example implementation consistent with the present disclosure, a computing apparatus, comprises: one or more processors; and a memory having stored therein machine-readable instructions that, when executed by the one or more processors, cause the one or more processors to: obtain, via a communication interface, vulnerability data related to a plurality of vulnerabilities associated with a plurality of computing systems; convert the obtained vulnerability data to one or more predetermined types of vulnerability data having respective one or more potential error indicators; store the converted vulnerability data to a first database assigned to raw vulnerability data; process the raw vulnerability data stored in the first database using a learning vulnerability processing model, said processing comprising: deriving, using the learning vulnerability processing model, a plurality of vulnerability characteristics associated with respective vulnerability records comprised in the raw vulnerability data, said plurality of vulnerability characteristics being selected from the group consisting of record identifier, operating component identifier, operating component version identifier, record source identifier, operating system, software application, network address, vulnerability status, vulnerability record structure, vulnerability type identifier, severity, and mitigation procedure; classifying a plurality of vulnerability types using the derived plurality of vulnerability characteristics; classifying, for each of one or more vulnerability records, a descriptive portion using a corresponding one or more of the vulnerability type classifications and the respective derived plurality of vulnerability characteristics; deriving, for the each of one or more vulnerability records, one or more description characteristics using the descriptive portion classification; generating one or more refined vulnerability parameters using the derived vulnerability characteristics and the derived one or more description characteristics; storing processed vulnerability data incorporating the generated one or more refined vulnerability parameters to a second database assigned to the processed vulnerability data; applying at least a portion of the processed vulnerability data to a task component to output one or more evaluation processes for a corresponding one or more processed vulnerability records; executing the outputted one or more evaluation processes on a performance measurement component to output one or more evaluation metrics, wherein the one or more evaluation metrics comprises a comparison metric for a comparison between the respective one or more potential error indicators in the raw vulnerability data and the corresponding one or more of the vulnerability type classifications; and updating one or more parameters of the learning vulnerability processing model using the outputted one or more evaluation metrics; receive, from a user via the communication interface, a prompt for a vulnerability report; generate the vulnerability report comprising one or more processed vulnerability records from the second database; and output, to the user via the communication interface, the vulnerability report comprising the one or more processed vulnerability records.

In one implementation, the processing of the raw vulnerability data is initially executed in a recursive training process for the learning vulnerability processing model, starting with the derived plurality of vulnerability characteristics from the raw vulnerability data using the learning document profiling model, to generate the one or more refined vulnerability parameters, the generated one or more refined vulnerability parameters from one or more executions of the processing of the raw vulnerability data using the learning vulnerability data model acting as at least a portion of the raw vulnerability data for a next iteration, until the one or more evaluation metrics meets a predetermined threshold, wherein one or more of the vulnerability types and descriptive portion associated with the raw vulnerability data is updated based on the one or more refined vulnerability parameters.

In an example implementation, the recursive training process is executed for 100 iterations per 1000 vulnerability records.

In one example implementation, the learning vulnerability processing model comprises a neural network-based architecture with one or more components for respective one or more of vulnerability record structure learning and vulnerability type ID learning.

In one implementation, the comparison metric relates to one or more of a false positive finding, a repeated item, and an inaccurate finding assignment.

In one example implementation, a threshold for the one or more evaluation metrics is equal to or greater than 70% for the comparison metric.

In one implementation, the vulnerability report excludes at least one of a false positive finding, a repeated item, and an inaccurate finding assignment.

According to an example implementation consistent with the present disclosure, a method, comprises: obtaining, via a communication interface by a computing apparatus configured by executing machine-readable instructions, vulnerability data related to a plurality of vulnerabilities associated with a plurality of computing systems; converting, by the computing apparatus, the obtained vulnerability data to one or more predetermined types of vulnerability data having respective one or more potential error indicators; storing, by the computing apparatus, the converted vulnerability data to a first database assigned to raw vulnerability data; processing, by the computing apparatus, the raw vulnerability data stored in the first database using a learning vulnerability processing model, said processing comprising: deriving, using the learning vulnerability processing model, a plurality of vulnerability characteristics associated with respective vulnerability records comprised in the raw vulnerability data, said plurality of vulnerability characteristics being selected from the group consisting of record identifier, operating component identifier, operating component version identifier, record source identifier, operating system, software application, network address, and vulnerability status; classifying a plurality of vulnerability types using the derived plurality of vulnerability characteristics; classifying, for each of one or more vulnerability records, a descriptive portion using a corresponding one or more of the vulnerability type classifications and the respective derived plurality of vulnerability characteristics; deriving, for the each of one or more vulnerability records, one or more description characteristics using the descriptive portion classification; generating one or more refined vulnerability parameters using the derived vulnerability characteristics and the derived one or more description characteristics; storing processed vulnerability data incorporating the generated one or more refined vulnerability parameters to a second database assigned to the processed vulnerability data; applying at least a portion of the processed vulnerability data to a task component to output one or more evaluation processes for a corresponding one or more processed vulnerability records; executing the outputted one or more evaluation processes on a performance measurement component to output one or more evaluation metrics, wherein the one or more evaluation metrics comprises a comparison metric for a comparison between the respective one or more potential error indicators in the raw vulnerability data and the corresponding one or more of the vulnerability type classifications; and updating one or more parameters of the learning vulnerability processing model using the outputted one or more evaluation metrics; receiving, by the computing apparatus from a user via the communication interface, a prompt for a vulnerability report; generating, by the computing apparatus, the vulnerability report comprising one or more processed vulnerability records from the second database; and outputting, by the computing apparatus to the user via the communication interface, the vulnerability report comprising the one or more processed vulnerability records.

In one implementation, the processing of the raw vulnerability data is initially executed in a recursive training process for the learning vulnerability processing model, starting with the derived plurality of vulnerability characteristics from the raw vulnerability data using the learning document profiling model, to generate the one or more refined vulnerability parameters, the generated one or more refined vulnerability parameters from one or more executions of the processing of the raw vulnerability data using the learning vulnerability data model acting as at least a portion of the raw vulnerability data for a next iteration, until the one or more evaluation metrics meets a predetermined threshold, wherein one or more of the vulnerability types and descriptive portion associated with the raw vulnerability data is updated based on the one or more refined vulnerability parameters.

In an example implementation, the recursive training process is executed for 100 iterations per 1000 vulnerability records.

In one example implementation, the learning vulnerability processing model comprises a neural network-based architecture with one or more components for respective one or more of vulnerability record structure learning and vulnerability type ID learning.

In one implementation, the comparison metric relates to one or more of a false positive finding, a repeated item, and an inaccurate finding assignment.

In one example implementation, a threshold for the one or more evaluation metrics is equal to or greater than 70% for the comparison metric.

In one implementation, the vulnerability report excludes at least one of a false positive finding, a repeated item, and an inaccurate finding assignment.

BRIEF DESCRIPTION OF THE DRAWING FIGURES

Various example implementations of this disclosure will be described in detail, with reference to the following figures, wherein.

DETAILED DESCRIPTION OF CERTAIN EMBODIMENTS ACCORDING TO THE DISCLOSURE

With the continuing development of sophisticated computing systems, vulnerabilities at various points within such systems can manifest whenever changes, updates, upgrades, etc. are introduced to them, which can occur frequently especially for large networked systems with many constituents. Consequently, large systems can suffer from very large numbers of potential vulnerabilities, the detection and processing of which can be obstructed by false positives, duplicates, different formats, etc. Accordingly, there is a need for an efficient and accurate method of detecting a myriad of such vulnerabilities so that the security and operability of such systems can be maintained despite frequent alterations to their operating environment.

By way of example, in the present disclosure, a vulnerability can be a software vulnerability that is characterized by a weakness in the computational logic (e.g., code) found in software components that, when exploited, results in a negative impact to confidentiality, integrity, or availability. In embodiments, software vulnerabilities can be found in embedded code—such as, firmware and the like—in hardware components. Software vulnerabilities can comprise operating system vulnerabilities that render apparatuses that execute certain operating systems susceptible to external exploitation—for example, Denial of Service (DOS) attacks and the like. Outdated and/or unpatched software can lead to operating system vulnerabilities. Additionally, a vulnerability can be a network vulnerability embodied by a hardware or software infrastructure weakness—for example, unsecured wireless access points, misconfigured firewalls, and the like. Furthermore, vulnerabilities can be presented by human or procedural weaknesses, such as weak passwords, substandard security protocols, human errors in executing malware or failing to update software, and the like.

The present disclosure provides a novel process to refine and centralize detected vulnerabilities using Machine Learning (ML). According to one example implementation of the present disclosure, a system adapted to execute this process comprises four (4) main core elements: a Data type converter, an off-loader database (DB), a ML processor, and a processed DB.

Figure 1:
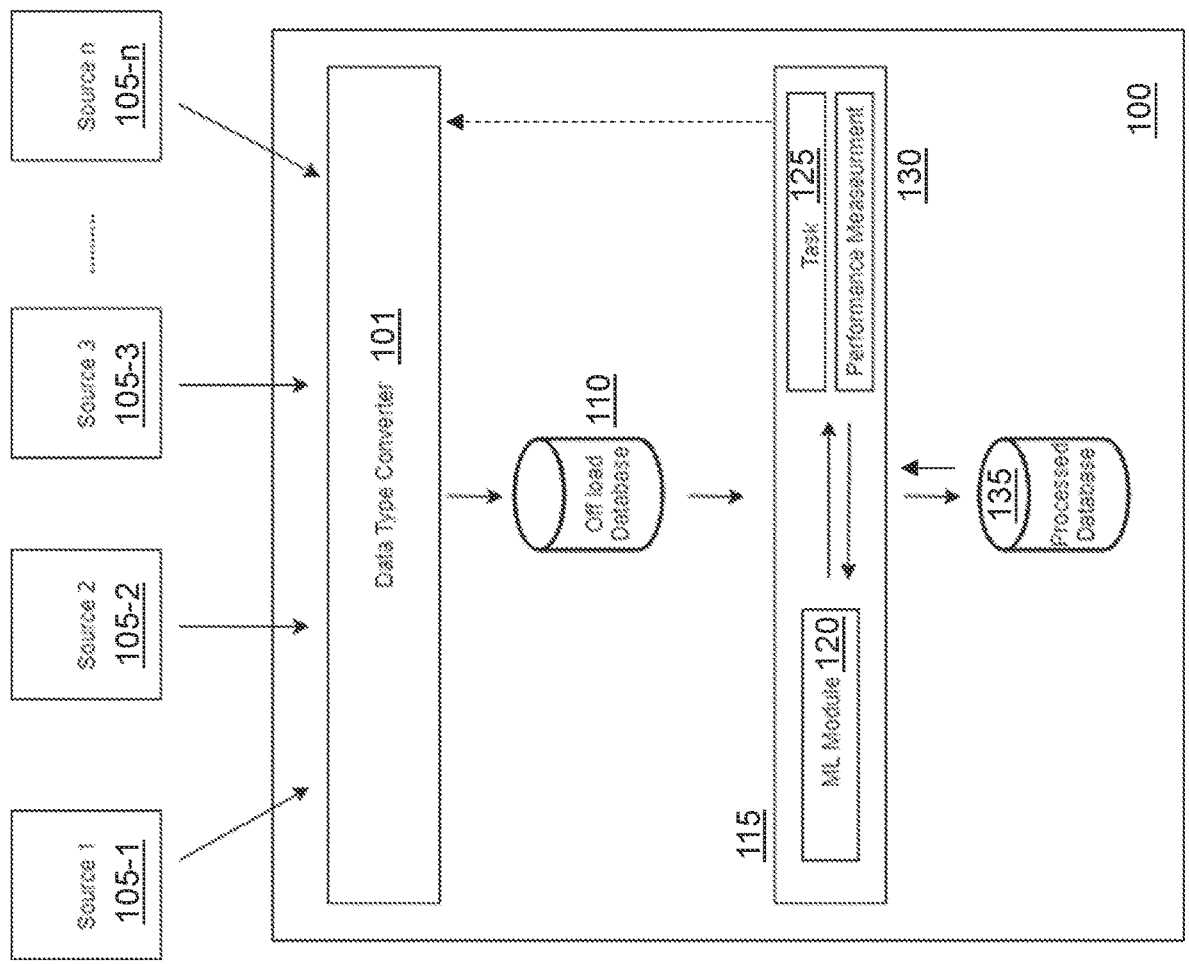
FIG. 1 is a schematic diagram that illustrates a vulnerability management system according to an example implementation of the present disclosure.

FIG. 1 is a schematic diagram that illustrates a vulnerability management system 100 according to an example implementation of the present disclosure.

As shown in FIG. 1, system 100 comprises a data type converter (DTC) 101 that collects and converts implicit and explicit vulnerabilities—for example, in the form of reported or detected vulnerability reports or records—from source systems (105-1, 105-2, 105-3, . . . , and 105-n, where n is an integer>1) (or collectively 105). In embodiments, systems 105-1, 105-2, 105-3, . . . , and 105-n can include software and/or hardware components of respective computing devices that operate with or in one or more networks. The vulnerabilities are collected from these systems (105-1 . . . 105-n) based on an error and/or intrusion reporting process—such as a software automatic error reporting system, network intrusion alerting and reporting system, human operator confirmation and reporting, and the like—as would be understood by one of ordinary skill in the art. In embodiments, one or more of sources 105 can comprise a respective published database of reported vulnerabilities for widely used software and hardware components. In embodiments, data collected from source systems 105 comprise private vulnerability data conforming to proprietary formats and/or publicly disclosed vulnerability data conforming to, for example, the Common Vulnerabilities and Exposures (CVE) format and the like.

According to one example implementation, data relating to detected vulnerabilities are converted to raw uniform vulnerability data that conforms to a uniform format for subsequent machine learning (ML) processing. In one embodiment, DTC 101 processes the received raw data to generate vulnerability data (401) with a uniform data format that comprises one or more potential error indicators, which is selected from the non-exhaustive list in Table 1 below. According to one implementation, DTC 101 identifies one or more types of vulnerabilities that are known for susceptibility to respective error or discrepancy types and assigns respective one or more indicators to the raw data for ML processing.

TABLE 1

| Field Name | Data Type | Value Range(s) |
| --- | --- | --- |
| False Positive Findings | Flag | 1 or 0 |
| Repeated Items | Flag | 1 or 0 |
| Inaccurate Findings assignments | Flag | 1 or 0 |
| Payload | Received Data from Source | As received |

In accordance with an example implementation, DTC 101 is embodied by a computing apparatus executing an application—for example, a Python program and the like—that monitors source systems 105 and processes detected or reported vulnerabilities. In one embodiment, the vulnerability data (401) comprises one or more files or records each associated with a reported or detected vulnerability from one or more of sources 105. After DTC 101 completes an iteration of collecting vulnerability data from source systems 105 and converting the collected data to a raw uniform format, the converted data is stored in an off-loader database (DB) 110. According to one example implementation, DTC 101 conducts automatic periodic iterations of vulnerability data collection and conversion—for example, an iteration can be conducted daily, weekly, monthly, etc. In embodiments, the iterations can be performed on an ad hoc basis—for example, by an operator-initiated process. Off-loader DB 110 hosts all of the collected and converted raw vulnerabilities data and serves as the source engine for a ML Processor 115, as illustrated in FIG. 1.

ML Processor 115 is adapted to identify, process, format, and apply updated designs for system 100 and source systems 105 to register and collect additional vulnerabilities. According to one implementation, ML Processor 115 comprises the following components:

ML Module 120, which comprises a trained ML mathematical model using past vulnerability data that feeds parameter data into a task component 125 and that is evaluated through a performance measurement component 130;

Task Component 125, which contains a continually updated collection of steps and decisions to study new vulnerabilities and corresponding conclusions relating to a sufficiency of the model of ML Module 120 for evaluating new and old data; and Performance Measurement Component 135, which comprises a feedback element for ML Module 120 to determine whether a data model design adequately meets an actual accepted design. According to an example embodiment, performance measurement component 135 comprises a backpropagation element to ML Module 120 for updating the model weights thereof, as will be described in further detail below.

As shown in FIG. 1, a processed database 135 is used to store refined vulnerability findings by ML processor 115, which are in a unified format, according to one example implementation of the present disclosure. Advantageously, all refined vulnerabilities are available in processed database 135. Accordingly, a user can prompt system 100 to generate a vulnerability report using processed database 135, which vulnerability report would exclude errors in the vulnerability data from sources 105—for example, one or more of false positive findings, repeated items, and inaccurate findings assignments.

Figure 2:
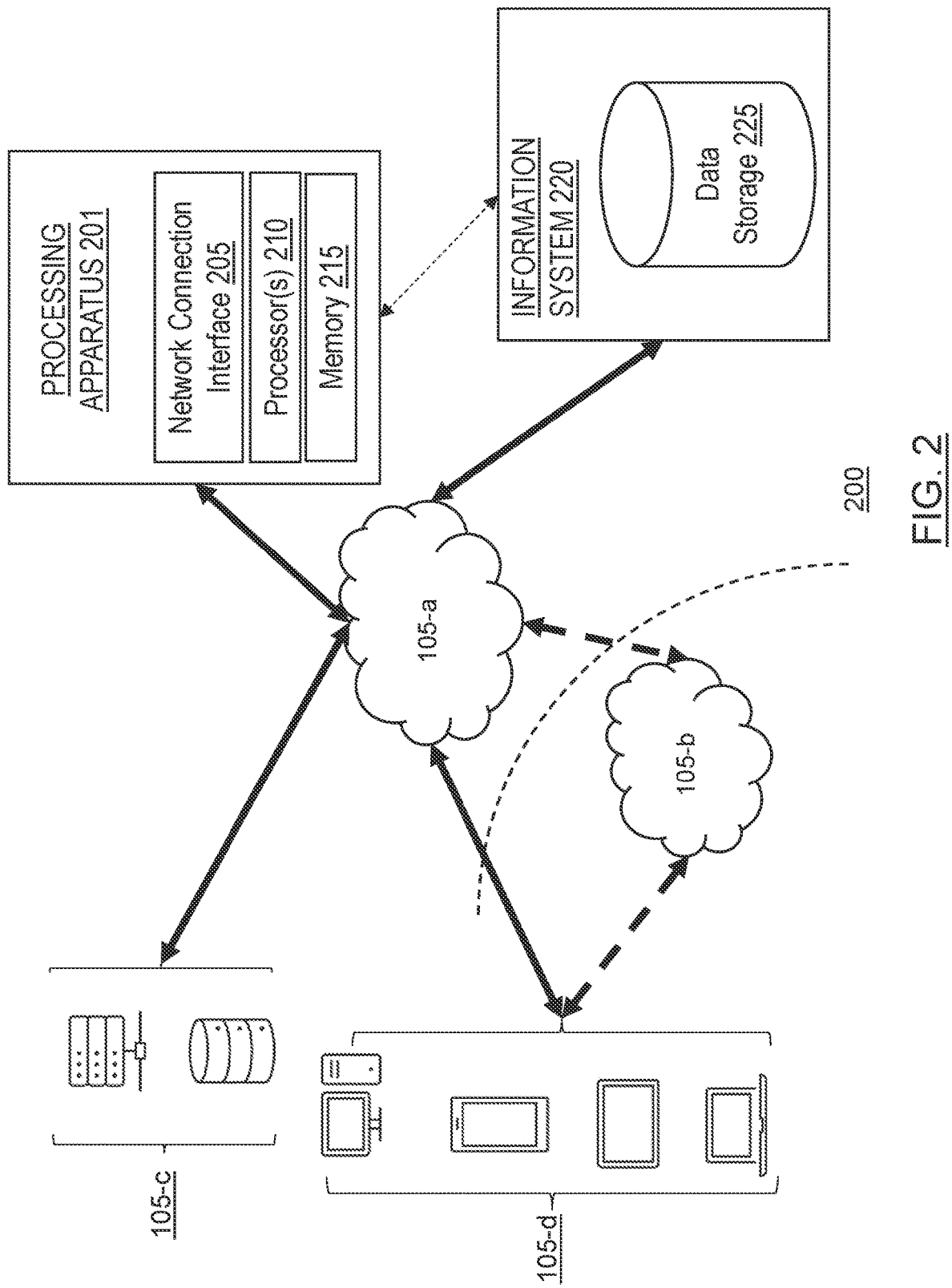
FIG. 2 is a schematic diagram of a system 200 for implementing vulnerability management system 100 and its associated processes according to an exemplary embodiment of the present disclosure.

FIG. 2 is a schematic diagram of a system 200 for implementing vulnerability management system 100 and its associated processes according to an exemplary embodiment of the present disclosure.

As shown in FIG. 2, system 200 comprises network 105-$a$, network 105-$b$, data computing apparatuses 105-$c$ that are constituents of network 105-$a$, and computing apparatuses that communicate with and/or are constituents of network 105-$a$ and/or 105-$b$.

According to one example implementation, network 105-$a$ is a data communication network that communicatively connects a processing apparatus 201 and an information system 220 with each other. Network 105-$b$ is another data communication network that communicatively connects to network 105-$a$. Thus, computing apparatuses 105-$c$ and 105-$d$ are capable of communicating with one another and/or form constituents of networks 105-$a$ and 105-$b$.

Networks 105-$a$ and 105-$b$ can be the Internet, an intranet network, a local area network, other wireless or other hardwired connection or connections, or a combination of one or more thereof, by which the aforementioned entities can communicate.

Communications systems for facilitating networks 105-$a$ and 105-$b$ can include hardware (e.g., hardware for wired and/or wireless connections) and/or software, and the communications interface hardware and/or software, which can be used to communicate over wired and/or wireless connections, can include Ethernet interfaces (e.g., supporting a TCP/IP stack), X.25 interfaces, T1 interfaces, and/or antennas, to name a few. Computer systems (e.g., 105-$c$ and 105-$d$) can communicate with other computer systems or devices directly and/or indirectly, e.g., through a data network, such as the Internet, a telephone network, a mobile broadband network (such as a cellular data network), a mesh network, Wi-Fi, WAP, LAN, and/or WAN, to name a few. For example, networks 105-$a$ and 105-$b$ can be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), which are some of the various types of protocols that can be used to facilitate communications among the elements communicatively connected to networks 105-$a$ and 105-$b$—for example, processing apparatus 201 and information system 220.

According to one example implementation, network 105-$a$ is an enterprise network that can be associated with any enterprise organization. Thus, processing apparatus 201 is communicatively connected to network 105-$a$ to embody DTC 101 in monitoring and collecting vulnerability data from source elements 105, including computing apparatuses 105-$c$ and/or 105-$d$. In one implementation, network 105-$a$ is a secure, private, enterprise network comprised of switches (not shown), routers (not shown), and other computing devices (e.g., 105-$c$ and/or 105-$d$) for facilitating communications and data exchanges among servers (e.g., 105-$c$) and information system 220, and clients (e.g., 105-$d$) while conforming to the above-described connections and protocols as understood by those of ordinary skill in the art. In embodiments, data communications and exchanges among the elements of network 105-$a$ can be encrypted. In embodiments, network 105-$a$ can be embodied by one or more private shared IP networks, corporate shared packet networks, Storage Area Networks (SAN), and/or dedicated communications conduits or circuits based on dedicated channels, such as Synchronous Digital Hierarchy (SDH), Synchronous Optical Networking SONET, Wave Division Multiplexing, dedicated cable, Digital Subscriber Line (DSL), dedicated fiber, or various forms of other non-shared IP packet networks as understood by those of ordinary skill in the art. In embodiments, network 105-$a$ can be further secured by firewalls (not shown) that prevent external intrusions into elements of network 105-$a$. In embodiments, computing apparatuses 105-$d$ can access network 105-$a$ via a virtual private network ("VPN") tunnel through network 105-$b$—for example, by employing Layer 2 Tunneling Protocol (L2TP) and the like.

In some implementations, the system architecture is language neutral allowing REST, JSON and Secure Socket Layers to provide the communication interface among the various computing devices (e.g., 201, 220, 105-$c$, and 105-$d$). Further, in one or more implementations, the architecture is built on the open secure socket layers, JSON, and/or REST APIs. Accordingly, the disclosed systems for vulnerability management and associated processing can implement open standards, thereby allowing interoperability. It should be further understood that while the various computing devices and machines referenced herein, including but not limited to processing apparatus 201, information system 220, and computing apparatuses 105-$c$ and 105-$d$, are referred to herein as individual/single devices and/or machines, the referenced devices and machines, and their associated and/or accompanying operations, features, and/or functionalities can be combined or arranged or otherwise employed across any number of devices and/or machines, such as over a network connection or wired connection, as is known to those of skill in the art. Correspondingly, functionality for any multiple entities can be combined and incorporated to a single apparatus without departing from the spirit and scope of the present disclosure. It should be further understood that networks 105-$a$ and 105-$b$ can be communicatively coupled to any number of additional computing apparatuses and/or networks.

In some embodiments, computing apparatuses 105-$c$ and 105-$d$ can communicate with one another, as well as processing apparatus 201 and information system 220, via a web browser using HTTP. Various additional communication protocols can be used to facilitate communications among the elements of network 105-$a$ and/or 105-$b$, which include the following non-exhaustive list, Wi-Fi (e.g., 802.11 protocol), Bluetooth, radio frequency systems (e.g., 900 MHz, 1.4 GHZ, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, FTP, RTP, RTSP, and/or SSH.

As can be understood by one of ordinary skill in the art, all of the elements 105 comprised in system 200 present potential vulnerabilities to their respective operations or to, for example, the secure operations of enterprise network 105-*a* and/or its constituents, such as computing apparatuses 105-*c* and 105-*d*. Thus, according to one example implementation, processing apparatus 201 embodies vulnerability management system 100 for managing the training and deployment processes for the ML vulnerability refinement process of the present disclosure.

In implementations, processing apparatus 201 embodies one or more of an application server, a network management apparatus, a data management system, and the like. In embodiments, the vulnerability refinement process of the present disclosure is applicable to any security and/or privacy management system incorporated in processing apparatus 201 for refining any system management, security, and/or privacy maintenance tasks related to network 105-*a* and/or any of the elements 105.

Correspondingly, as shown in FIG. 2, processing apparatus 201 incorporates communications circuitry ("Network Connection Interface") 205, one or more processor(s) 210, and a memory 215.

Network connection interface 205 can include any circuitry allowing or enabling one or more components of processing apparatus 201 to communicate with one or more additional devices, servers, and/or systems over network 105-*a*—for example, one or more of information system 220, computing apparatuses 105-*c*, 105-d, and network 105-*b*. Network connection interface 205 can use any of the previously mentioned exemplary communications protocols. According to an exemplary embodiment, network connection interface 205 comprises one or more universal serial bus ("USB") ports, one or more Ethernet or broadband ports, and/or any other type of hardwire access port to communicate with network 105-*a* and, accordingly, information system 220, computing apparatuses 105-*c*, 105-*d*, and network 105-*b*.

One or more processor(s) 210 can include any suitable processing circuitry capable of controlling operations and functionality of processing apparatus 201, as well as facilitating communications between various components within processing apparatus 201. In some embodiments, processor(s) 210 can include a central processing unit ("CPU"), a graphic processing unit ("GPU"), one or more microprocessors, a digital signal processor, or any other type of processor, or any combination thereof. In some embodiments, the functionality of processor(s) 210 can be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 210 can include its own local memory, which can store program systems, program data, and/or one or more operating systems.

Memory 215 can include one or more types of storage mediums such as any volatile or non-volatile memory, or any removable or non-removable memory implemented in any suitable manner to store data for processing apparatus 201. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 215 can be implemented as computer-readable storage media ("CRSM"), which can be any available physical media accessible by processor(s) 210 to execute one or more instructions stored within memory 215. According to an exemplary embodiment, one or more applications corresponding to the vulnerability refinement and associated processing, including the data and network structures illustrated in FIG. 4 as well as data and instructions related to ML processor 115, are executed by processor(s) 210. In embodiments, the instructions and data associated with these processes can be stored in memory 215 and/or at information system 220.

According to an example implementation of the present disclosure, processing apparatus 201 is in communication with information system 220 via direct connection and/or via network 200. As illustrated in FIG. 2, information system 220 maintains data storage 225, which can incorporate one or more database(s) embodied in servers and corresponding storage media for storing, for example, off-loader DB 110, processed DB 135, and/or the vulnerability refinement and associated processing, including the data and network structures illustrated in FIG. 4 as well as data and instructions related to ML processor 115. Correspondingly, in embodiments, processing apparatus 201 and at least a part of network 105-*a* can be maintained by and/or associated with an entity of the enterprise network. According to an exemplary embodiment, at least portions of off-loader DB 110 and/or processed DB 135 can also be stored in memory 215.

Exemplary storage media for the data storage of data storage 225 correspond to those described above with respect to memory 215, which will not be repeated here. In embodiments, information system 220 can incorporate a database management system (DBMS) and be comprised of one or more database servers that support Oracle SQL, NoSQL, NewSQL. PostgreSQL, MySQL, Microsoft SQL Server, Sybase ASE, SAP HANA, DB2, and the like. Information system 220 incorporates a network connection interface (not shown) for communications with network 105-*a* and exemplary implements of which can include those described above with respect to network connection interface 205, which will not be repeated here.

In embodiments, processing apparatus 201 and/or information system 220 can implement an application server adapted to host one or more applications that are accessible and executable over network 105-*a* by one or more users at, for example, respective computing apparatuses 105-*d*. In embodiments, executable portions of applications maintained at the application server can be offloaded to the computing apparatuses 105-*d*.

Computing apparatuses 105-*c* can be any computing and/or data processing apparatus that communicates with and/or forms a respective constituent of network 105-*a*. Example implementations of computing apparatuses 105-*c* can conform to those of processing apparatus 201 and/or information system 220 described above and will not be repeated here.

Computing apparatuses 105-*d* can be any computing device and/or data processing apparatus capable of embodying the systems and/or methods described herein and can include any suitable type of electronic device including, but not limited to, desktop computers, mobile computers (e.g., laptops, ultrabooks), mobile phones, portable computing devices, such as smart phones, tablets, personal display devices, personal digital assistants ("PDAs"), virtual reality (VR) devices, wearable devices (e.g., watches), to name a few, with network (e.g., Internet) access that is uniquely identifiable by Internet Protocol (IP) addresses, Internet cookies, Media Access Control (MAC) identifiers, or online personal accounts of individual users (e.g., entity account of a user), either directly or through another personal device.

As can be understood by one of ordinary skill in the art, computing apparatuses 105-d can each include one or more processor(s) (not shown), a memory (not shown), a network interface (not shown), and a user interface (not shown), among other elements. The processor(s), memory, and network interface can be implemented in accordance with the exemplary implementations for processor(s) 210, memory 215, and network connection interface 205, respectively, and will not be repeated here. In some embodiments, computing apparatuses 105-d can include one or more antennas (not shown) to facilitate wireless communications with a network using various wireless technologies (e.g., Wi-Fi, Bluetooth, radiofrequency, etc.). In yet another embodiment, computing apparatuses 105-d can include one or more universal serial bus ("USB") ports, one or more Ethernet or broadband ports, and/or any other type of hardwire access port to communicate with others of elements 105. Additionally, computing apparatuses 105-d can execute an operating system ("OS") and/or one or more firmware applications and/or applications resident thereon in correspondence with processing apparatus 201. In some embodiments, computing apparatuses 105-d can run a local client script for reading and rendering data received from processing apparatus 201 and/or information system 220. The user interfaces of computing apparatuses 105-d can include one or more input or output device(s), such as switch(es), button(s), key(s), touch screen(s), display(s), microphone(s), speaker(s), camera(s), sensor(s), etc. as would be understood in the art of electronic computing devices.

Accordingly, in embodiments, an operator can employ a computing apparatus 105-d to interact with processing apparatus 201 and/or information system 220 to retrieve information related to processed vulnerability data stored in processed DB 135. As an example, a user can transmit a prompt for a vulnerability report to processing apparatus 201 and/or information system 220 using an application that is executed on computing apparatus 105-d. In response to the prompt, processing apparatus 201 and/or information system 220 can retrieve processed vulnerability data, which is processed by ML processor 115, from processed DB 135 to generate a vulnerability report for transmission back to computing apparatus 105-d. Advantageously, as described in further detail below, the generated vulnerability report excludes errors in vulnerability detection by recognizing potential errors in the vulnerability data using ML processor 115. In embodiments, vulnerability reports can be generated automatically on a predetermined schedule—e.g., daily, weekly, monthly, quarterly, and the like—for transmission to one or more of computing apparatuses 105-d.

Figure 3:
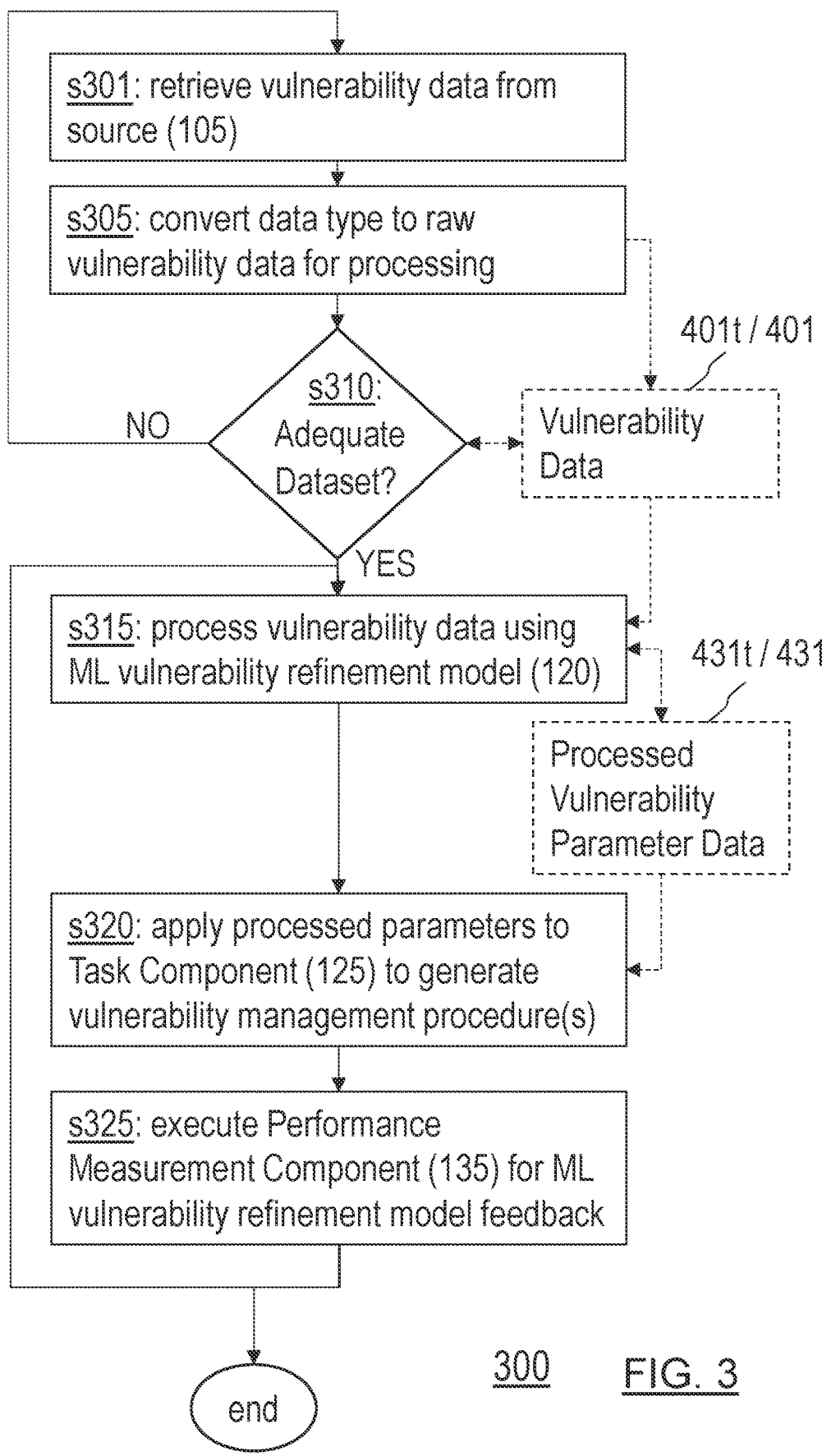
FIG. 3 is a flow diagram of a vulnerability refinement model process for training and deploying a ML processor in accordance with an example implementation of the present disclosure.

FIG. 3 is a flow diagram of a vulnerability refinement model process 300 for training and deploying ML processor 115 in accordance with an example implementation of the present disclosure. In embodiments, process 300, along with the data and network structures illustrated in FIG. 4, can be executed, in part or in the whole, by processing apparatus 201, one or more of computing apparatuses 105-c and 105-d, and/or information system 220. The data resulting from these processes, including the ML training, can, likewise, be maintained, in part or in the whole, by information system 220, processing apparatus 201, and/or computing apparatuses 105-c and 105-d. Correspondingly, the processes and data related to the vulnerability refinement process (e.g., steps s301, s305, s310, s315, s320, and s325, along with their associated processing and network structures illustrated in FIG. 4) can be executed/maintained, in part or in the whole, by information system 220, processing apparatus 201, and/or computing apparatuses 105-c and 105-d.

As illustrated in FIG. 3, process 300 initiates with step s301 of retrieving raw vulnerability data from one or more data source(s) 105 by DTC 101. As described with reference to FIG. 1, step s301 can entail collecting detected or reported vulnerabilities based on an error and/or intrusion reporting process—such as a software automatic error reporting system, software scanning application, network intrusion alerting and reporting system, human operator confirmation and reporting, and the like—as would be understood by one of ordinary skill in the art. In embodiments, step s301 can also entail retrieving vulnerability data from one or more published databases of reported vulnerabilities for widely used software and hardware components.

Figure 4:
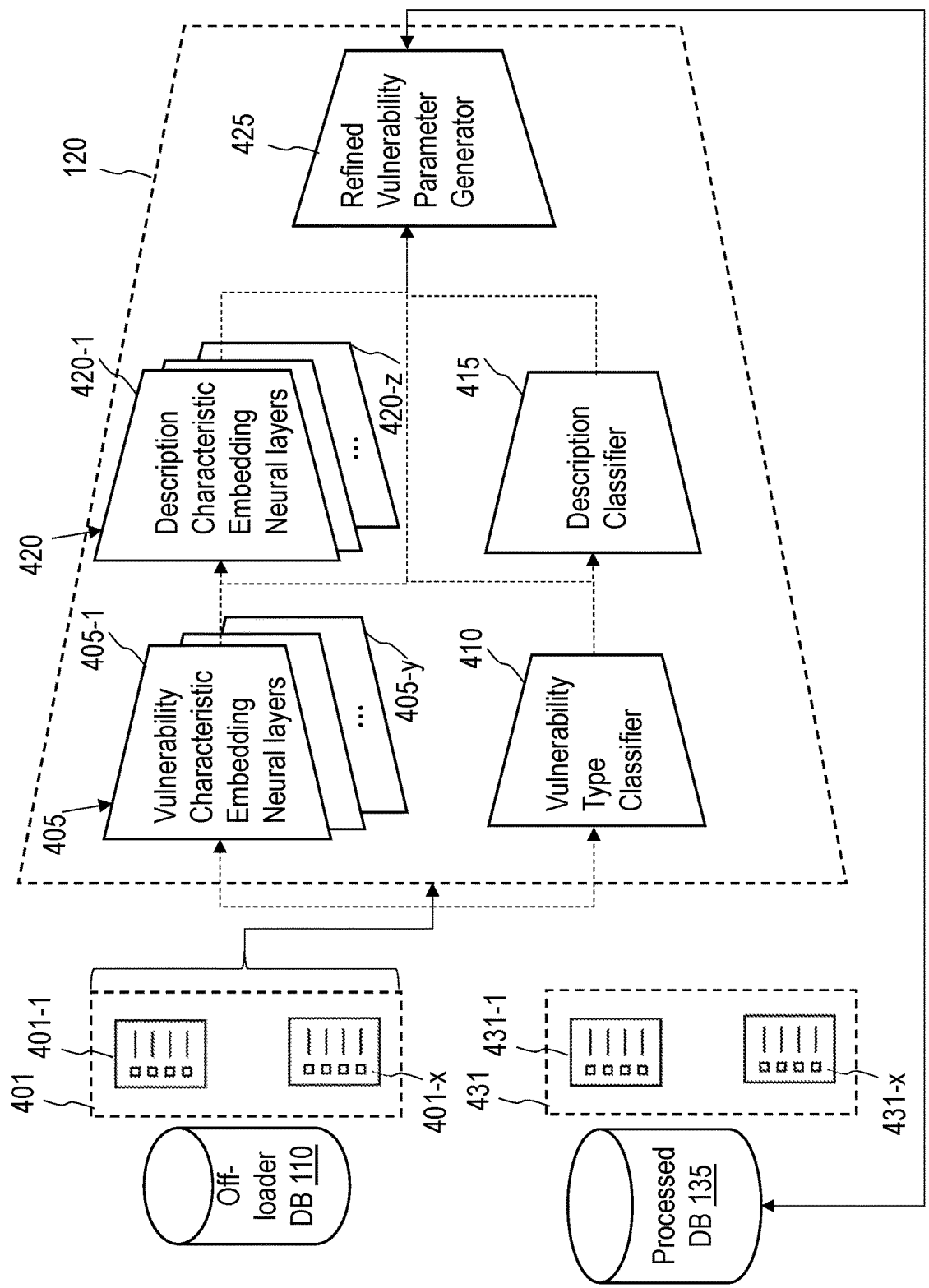
FIG. 4 is a schematic diagram of a network structure for a ML vulnerability refinement model according to an example implementation of the present disclosure.

Next, at step s305, the retrieved data is converted by DTC 101 to a uniform format suitable for ML processing and saved to an off-loader DB 110. According to one implementation, data stored to off-loader DB 110 includes a plurality of vulnerability records (e.g., 401-1 . . . 401-x, x>=1, as illustrated in FIG. 4) collected from sources 105 and converted by DTC 101 that form at least a subset of all vulnerabilities reported or detected for system 200 illustrated in FIG. 2. In embodiments, data stored to off-leader DB 110 can include labeled data, such as data from manual categorizations, partial labels, active human supervision, and the like.

According to one example implementation, for an initial execution of process 300, a determination is made, at step s310, of whether an adequate set of vulnerability data 401—e.g., 401t—has been collected at off-loader DB 110 for training model 120. Steps s301 and s305 are repeated if it is determined in the negative ("NO") and process 300 proceeds to step s315 if it is determined in the positive ("YES").

In one implementation, steps s301 and s305 can be performed periodically or on an ad hoc basis through an automatic or a manual initiation. In embodiments, they can be performed on a related schedule to, or an independent schedule from, the remaining steps of process 300.

Once an adequate set of vulnerability data has been stored to off-loader DB 110, process 300 proceeds to step s315 of processing the collected vulnerability data 401t/401 (the suffix t denoting training data for an initial execution of process 300, which can be a subset of the vulnerability data collected by DTC 101 and designated by an operator) using a ML vulnerability refinement model 120 to obtain processed vulnerability parameter data 431t/431. In embodiments, vulnerability data 401t/401 can include at least a subset of the data from off-loader DB 110. According to an example implementation, the ML vulnerability refinement model 120 is trained and adapted to refine vulnerability characterizations, detection, and/or mitigation parameters. In embodiments, training vulnerability data 401t can comprise actual vulnerability data 401 collected by DTC 101 and can be grouped by the types of vulnerabilities that are known for susceptibility to respective one or more error or discrepancy types—for example, false positive findings, repeated items, inaccurate findings assignment, and the like. In embodiments, separate versions of model 120 can be trained, maintained, and deployed via process 300 for the grouped vulnerability types—for example, using DTC 101 to assign the respective vulnerability types to respective versions of model 120 for processing. Thus, as illustrated in FIG. 1, according to one implementation, ML processor 115 feeds back assignment and/or filtering parameters to DTC 101 for updating appropriate processing of raw vulnerability data obtained from sources 105 to DB 110.

Referring back to FIG. 3, process 300 next proceeds to step s320 of applying processed vulnerability parameter data 431t/431 generated by model 120 to a task component 125 to update a collection of steps and decisions to evaluate new vulnerabilities. In one example implementation, task component 125 comprises one or more executable applications that correlates processed vulnerability parameter data 431t/431 to corresponding steps and decisions associated with evaluating one or more reported or detected vulnerabilities collected by DTC 101. According to one embodiment, task component 125 continually updates the collection of steps and decisions to evaluate new vulnerabilities once training process 300 is completed and model 120 is deployed. The processed parameters comprise three (3) categories to which processed parameter data 431t/431 are grouped for further training model 120: False Positive Finding, Repeated Item, and Inaccurate Finding Assignment. In embodiments, the processed parameters can include, but not limited to, record identifier (ID), operating component ID, operating component version ID, driver ID, firmware ID, record source ID, operating system (OS) (if applicable), software application (if applicable), network address, vulnerability status, vulnerability record structure, vulnerability type ID, severity, and mitigation procedure, cause, impact, severity, known solution(s), to name a few.

In embodiments, the Task component 125 can include a user interface element—for example, an executable component at one or more of computing apparatuses 105-$d$—for receiving an input by an operator on steps and/or decisions in evaluating one or more vulnerabilities.

Next, at step s325, the evaluation step(s) and/or decision(s) defined by the task component 125 are executed by the Performance Measurement component 130 to output one or more evaluation metrics for ML Module 120 to determine whether it adequately detects all significant vulnerabilities from sources 105. According to one implementation, the evaluation metrics of component 130 comprise the non-exhaustive list of metrics and corresponding thresholds listed in Table 2 below.

TABLE 2

| Metric | Variable | Threshold Range(s) |
| --- | --- | --- |
| False Positive Findings | Percentage | ≥70% |
| Repeated Items | Percentage | ≥70% |
| Inaccurate Findings assignment | Percentage | ≥70% |

Thus, in one implementation, a trained ML model checks past vulnerability data and, then, flags False Positive Findings, Repeated Items, and Inaccurate Findings assignments, respectively, the results of which are evaluated according to the metrics of Table 2.

In embodiments, the Performance Measurement component 130 can include a user interface element—for example, an executable component at one or more of computing apparatuses 105-$d$—for receiving an input by an operator on metrics data in correspondence with the steps and/or decisions for Task Component 125. Additionally, in embodiments, Task component 125 and Performance Measurement component 130 can cooperate to update processed DB 135 for backpropagating through ML module 120 to adjust the weights thereof. As an example, step s325 of process 300 comprises the Performance Measurement component 130 determining whether processed vulnerability parameter data 431 outputted by ML vulnerability refinement model 120 approaches values that minimize discrepancies from underlying data of raw vulnerability data 401 based on one or more of the thresholds of Table 3. According to one implementation, the Performance Measurement component 130 outputs a comparison metric that reflects a comparison between the respective one or more potential error indicators identified by DTC 101 and corresponding vulnerability type classifications using model 120. Thus, in one implementation, Performance Measurement component 130 is adapted to determine whether ML vulnerability refinement model 120 has reached an acceptable state of meeting the thresholds of Table 2 in identifying the respective potential errors included in the vulnerability data.

In accordance with one example implementation and as illustrated in FIG. 3, steps s315, s320, and s325 are conducted in a recursive or iterative manner so that processed vulnerability parameter data 431 (431t) and model 120 reach a steady state of vulnerability classification. In one example, 100 iterations are conducted per x=1000 vulnerabilities (see FIG. 4). Thus, ML model 120 is trained to at least process off-loaded vulnerability data at DB 110 to recognize one or more of: False Positive Finding, Repeated Item, and Inaccurate Finding Assignment.

After training of ML vulnerability refinement model 120 using vulnerability data 401t has reached an acceptable state, or completed, the trained ML vulnerability refinement model 120 is deployed to actively process actual vulnerability data 401. According to one embodiment, an initial one or more iterations of process 300 can be executed for training model 120 using training data 401t and 431t and subsequent iterations of process 300 can be executed for deploying model 120 using actual data 401 and 431 to refine reported and detected vulnerabilities. In the deployment iterations of process 300, steps s301 and s305 are continually performed periodically or on an ad hoc basis through an automatic or a manual initiation to retrieve and collect vulnerabilities that are stored to off-loader DB 110. Correspondingly, in embodiments for deploying model 120, step s310 can trigger ("YES") on a predetermined number of vulnerabilities collected at off-loader DB 110 or be foregone so that steps s315, s320, and s325 can be performed on a related schedule to steps s301 and s305, or on an independent schedule to periodically process the off-loaded vulnerabilities. In embodiments, during deployment of model 120 using process 300, steps s310 can be manually triggered ("YES") to proceed to steps s315, s320, and s325 for processing off-loaded vulnerabilities. Additionally, in embodiments, during deployment of model 120 using process 300, step s325 can comprise feedback from ML processor 115 to DTC 101 on improving data type conversions for collecting and categorizing newly-detected or newly-reported vulnerabilities from sources 105, as illustrated in FIG. 1.

FIG. 4 is a schematic diagram of a network structure for a ML vulnerability refinement model 120 for performing process 300 shown in FIG. 3 according to an example implementation of the present disclosure.

As illustrated in FIG. 4, vulnerability data 401 includes a plurality of detected or reported vulnerability records (e.g., 401-1 . . . 401-$x$) that have been collected and converted by DTC 101. As described with reference to FIG. 3, a training subset 401t of vulnerability data 401 can be used to train model 120. Referring back to FIG. 4, vulnerability data 401

(or 401*t* during training) is input to ML vulnerability refinement model 120 for profiling the respective types of vulnerabilities and the respective individual detected or reported vulnerabilities (e.g., 401-1 . . . 401-*x*) based on a number of characteristics.

According to an example implementation, ML vulnerability refinement model 120 is adapted to a system security management application and incorporates a reconfigurable neural network-based system (or "machine learning network"). In embodiments, ML vulnerability refinement model 120 can include any number of algorithmic subcomponents, including but not limited to deep neural networks and other machine learning algorithms, together with adaptive connectivity and parameters that can be reconfigured based on performance or other factors. The various machine learning algorithms employed can be supervised, semi-supervised or unsupervised. In the case of supervised machine learning algorithms, the ML vulnerability refinement model 120 learns from the correlation between, for example, raw vulnerability data and labelled data. As an example, with reference to FIG. 3, training data 401*t* can comprise labelled data based on various characteristics among identified types of vulnerabilities and individual detected/reported vulnerabilities. In embodiments, labelled data can include manual categorizations, partial labels, and data input as part of active human supervision to name a few. Machine learning networks can be employed instead of a predefined condition or parameter to determine, at least in part, the types and characteristics of the vulnerabilities (e.g., 401-1 . . . 401-*x*) included in vulnerability data 401. Regardless of the kind of machine learning model, the ML vulnerability refinement model 120 incorporates data preprocessing, data normalization, feature derivation or extraction, feature selection, as well as other steps required to obtain a complete and fully operational machine learning system, as would be understood by those of ordinary skill in the art.

In accordance with an example implementation and as shown in FIG. 4, vulnerability data 401 (or 401*t* during training) is received and processed by a plurality of vulnerability characteristic embedding neural layers 405 (e.g., 405-1 . . . 405-*y*) (e.g., y>=2) that are fully connected (dense) neural layers to learn dense record-level characteristic embeddings, which result in representations (e.g., various data structures such as vector, matrices, and the like) (not shown) of the respective record-level characteristics. According to one example implementation, the vulnerability record characteristic representations (not shown) include, without limitation, those for record identifier (ID), operating component ID, operating component version ID, driver ID, firmware ID, record source ID, operating system (OS) (if applicable), software application (if applicable), network address, vulnerability status, vulnerability record structure, vulnerability type ID, severity, and mitigation procedure, to name a few. These representations form a basis for determining a vulnerability type profile for each type of vulnerability included in raw vulnerability data 401 by a vulnerability type profile classifier 410, which classifies the vulnerability records (e.g., 401-1 . . . 401-*x*) included in raw vulnerability data 401 based on their respective characteristics. Thus, the representations generated by embedding layers 405 are suitable for training vulnerability type profile classifier 410 and description classifier 415. Correspondingly, the representations form a basis for the generation of refined vulnerability parameters by generator 425.

Vulnerability types and characteristics further form bases for classifying one or more descriptive portions that are included in each vulnerability type in vulnerability data 401 by a description classifier 415. In one implementation, description classifier 415 identifies the one or more descriptive portions of each vulnerability record (e.g., 401-1 . . . 401-*x*) for processing by description characteristic embedding neural layers 420 (e.g., 420-1 . . . 420-2) (e.g., z>=2) incorporated in model 120 to learn dense sub-record-level characteristics associated with each of the one or more descriptive portions included in each vulnerability type and individual record. In embodiments, description classifier can incorporate one or more determination processors for dividing each vulnerability record (e.g., 401-1 . . . 401-*x*) into respective one or more portions for processing by description characteristic embedding neural layers 420.

In embodiments, description characteristic representations can, in turn, form at least partial bases for record-level characteristic determinations—for example, for determining cause, impact, severity, known solution(s), etc., for each vulnerability type and, thus, its corresponding type profile. In other words, description characteristics determined by the description characteristic embedding layers 420 can inform cause, impact, severity, and known solution(s) determinations by vulnerability characteristic neural layers 405 and, in turn, vulnerability type profile classifier 410. The learned vulnerability types, record-level characteristics, identified description, and sub-record-level characteristics collectively form a basis for determining a vulnerability record profile and a corresponding vulnerability type profile for each record (e.g., 401-1 . . . 401-*x*) included in vulnerability data 401. In accordance with an example implementation, a refined vulnerability parameter generator 425 is incorporated in ML vulnerability refinement model 120 for generating individual parameters, vulnerability record profiles, and vulnerability type profiles for respective refined records (e.g., 431-1 . . . 431-*x*) in processed data 431 based on the aforementioned characteristics.

In accordance with an example implementation of the present disclosure, record-level and sub-record-level characteristics that are classified by respective neural layers 405 and 420 include, but are not limited to: pre-defined parameters, accepted acronym characteristics, operating standards characteristics, source reporting reliability characteristics, OS environment characteristics, report format characteristics, etc.

According to one implementation, known structure and format matches are incorporated in vulnerability characteristic embedding neural layers 405 and description classifier 415 for identifying respective one or more descriptive portions in each record (e.g., 401-1 . . . 401-*x*). Additionally, neural layers 405 further learn embeddings for respective identifiers for record ID, operating component ID, operating component version ID, driver ID, firmware ID, record source ID, record source, operating system (OS) (if applicable), software application (if applicable), network address, vulnerability status, vulnerability record structure, vulnerability type ID, severity, mitigation procedure, and the like. For each identified descriptive portion and identifier, neural layers 420 learn corresponding embeddings on keyword and acronym characteristics, indicators for cause, impact, severity, known solution(s), and the like. Thus, in embodiments, these characteristics can inform neural layers 405 as feedback on learning embeddings on relative significance and the like.

As should be understood by one of ordinary skill in the art, classifiers 410 and 415 and refined vulnerability parameter generator 425 can incorporate ensembles of multiple classifiers that are combined in one of various ways, such as classifier stacking and the like, and, in one implementation, form multi-class discriminators (e.g., classification neural networks) that employ any machine learning model, including but not limited to dense neural networks, convolutional neural networks, transformers, etc.

According to one implementation of the present disclosure, the training process is an iterative process that is based on alternating two steps, a forward pass and backward pass, until the prediction error of model 120 is sufficiently low based on feedback from components 125 and 130. In the forward pass, vulnerability data 401 (or training data 401*t*) is passed through model 120 to generate predicted class labels. In the backward pass, errors of the predictions are used to update and improve model 120 and reduce its errors. In one implementation, as described with reference to FIG. 3, task component 125 generates one or more vulnerability management and evaluation procedures, which can include a collection of steps and decisions to evaluate new vulnerabilities (see Table 2), and Performance Measurement component 130 outputs one or more evaluation metrics for ML Module 120 (see Table 3) based on one or more executions of the management and evaluation procedures. To update the weights of model 120, errors reflected by the metrics are backpropagated through the network of model 120 via processed DB 135. After some iterations (epochs) (e.g., 100) over the training data 401*t* (or vulnerability data 401), the weights of ML vulnerability refinement model 120 approach values that minimize the prediction errors on the training data set.

As described before, an operator—for example, by using a computing apparatus 105-*d*—can set a periodic or ad hoc vulnerability processing scheme using system 100 to continually process detected or reported vulnerabilities from sources 105 using ML processor 115. Accordingly, ML processor 115 continually improves its own performance as well as the data conversion conducted by DTC 101. Advantageously, the ML processor 115 through the above-described training and continual improvements, learns to cull inaccurate or repeated vulnerability detections or reports based on learned detection for false positive findings, repeated items, inaccurate findings assignment, to name a few.

Advantageously, the vulnerability detection and management process of the present disclosure provides a technical solution to the problem of large numbers of varied vulnerabilities faced by entities that maintain large and complex computing systems and that require different processing techniques to derive or extract meaningful information to mitigate such vulnerabilities. By training a vulnerability processing model that can be customized to each entity through the training, the present disclosure provides a technical solution to the above-stated problems of detecting, managing, and mitigating vulnerabilities in large scale computing systems.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). To facilitate understanding, reference numerals have been used, where possible, to designate like elements common to the figures. In certain instances, a letter suffix following a dash ( . . . -b) denotes a specific example of an element marked by a particular reference numeral (e.g., 210-*b*). Description of elements with references to the base reference numerals (e.g., 210) also refer to all specific examples with such letter suffixes (e.g., 210-*b*), and vice versa.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof, and are meant to encompass the items listed thereafter and equivalents thereof as well as additional items.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting.

While the disclosure has described several example implementations, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to embodiments of the disclosure without departing from the essential scope thereof. Therefore, it is intended that the disclosure not be limited to the particular embodiments disclosed, or to the best mode contemplated for carrying out this disclosure, but that the disclosure will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope encompassed by the present disclosure, which is defined by the set of recitations in the following claims and by structures and functions or steps which are equivalent to these recitations.

What is claimed is:

1. A computing apparatus, comprising:
one or more processors; and
a memory having stored therein machine-readable instructions that, when executed by the one or more processors, cause the one or more processors to:
obtain, via a communication interface, vulnerability data related to a plurality of vulnerabilities associated with a plurality of computing systems;
convert the obtained vulnerability data to one or more predetermined types of vulnerability data having respective one or more potential error indicators;
store the converted vulnerability data to a first database assigned to raw vulnerability data;
process the raw vulnerability data stored in the first database using a learning vulnerability processing model, said processing comprising:
deriving, using the learning vulnerability processing model, a plurality of vulnerability characteristics associated with respective vulnerability records comprised in the raw vulnerability data, said plurality of vulnerability characteristics being selected from the group consisting of record identifier, operating component identifier, operating component version identifier, record source identifier, operating system, software application, network address, vulnerability status, vulnerability record structure, vulnerability type identifier, severity, and mitigation procedure;
classifying a plurality of vulnerability types using the derived plurality of vulnerability characteristics;
classifying, for each of one or more vulnerability records, a descriptive portion using a corresponding one or more of the vulnerability type classifications and the respective derived plurality of vulnerability characteristics;
deriving, for the each of one or more vulnerability records, one or more description characteristics using the descriptive portion classification;
generating one or more refined vulnerability parameters using the derived vulnerability characteristics and the derived one or more description characteristics;
storing processed vulnerability data incorporating the generated one or more refined vulnerability parameters to a second database assigned to the processed vulnerability data;
applying at least a portion of the processed vulnerability data to a task component to output one or more evaluation processes for a corresponding one or more processed vulnerability records;
executing the outputted one or more evaluation processes on a performance measurement component to output one or more evaluation metrics, wherein the one or more evaluation metrics comprises a comparison metric for a comparison between the respective one or more potential error indicators in the raw vulnerability data and the corresponding one or more of the vulnerability type classifications; and
updating one or more parameters of the learning vulnerability processing model using the outputted one or more evaluation metrics;

receive, from a user via the communication interface, a prompt for a vulnerability report;
generate the vulnerability report comprising one or more processed vulnerability records from the second database; and
output, to the user via the communication interface, the vulnerability report comprising the one or more processed vulnerability records.

2. The computing apparatus of claim 1, wherein the processing of the raw vulnerability data is initially executed in a recursive training process for the learning vulnerability processing model, starting with the derived plurality of vulnerability characteristics from the raw vulnerability data using the learning document profiling model, to generate the one or more refined vulnerability parameters, the generated one or more refined vulnerability parameters from one or more executions of the processing of the raw vulnerability data using the learning vulnerability data model acting as at least a portion of the raw vulnerability data for a next iteration, until the one or more evaluation metrics meets a predetermined threshold, wherein one or more of the vulnerability types and descriptive portion associated with the raw vulnerability data is updated based on the one or more refined vulnerability parameters.

3. The computing apparatus of claim 2, wherein the recursive training process is executed for 100 iterations per 1000 vulnerability records.

4. The computing apparatus of claim 1, wherein the learning vulnerability processing model comprises a neural network-based architecture with one or more components for respective one or more of vulnerability record structure learning and vulnerability type ID learning.

5. The computing apparatus of claim 1, wherein the comparison metric relates to one or more of a false positive finding, a repeated item, and an inaccurate finding assignment.

6. The computing apparatus of claim 5, wherein a threshold for the one or more evaluation metrics is equal to or greater than 70% for the comparison metric.

7. The computing apparatus of claim 1, wherein the vulnerability report excludes at least one of a false positive finding, a repeated item, and an inaccurate finding assignment.

8. A method, comprising:
obtaining, via a communication interface by a computing apparatus configured by executing machine-readable instructions, vulnerability data related to a plurality of vulnerabilities associated with a plurality of computing systems;
converting, by the computing apparatus, the obtained vulnerability data to one or more predetermined types of vulnerability data having respective one or more potential error indicators;
storing, by the computing apparatus, the converted vulnerability data to a first database assigned to raw vulnerability data;
processing, by the computing apparatus, the raw vulnerability data stored in the first database using a learning vulnerability processing model, said processing comprising:
deriving, using the learning vulnerability processing model, a plurality of vulnerability characteristics associated with respective vulnerability records comprised in the raw vulnerability data, said plurality of vulnerability characteristics being selected from the group consisting of record identifier, operating component identifier, operating component version identifier, record source identifier, operating system, software application, network address, and vulnerability status;

classifying a plurality of vulnerability types using the derived plurality of vulnerability characteristics;

classifying, for each of one or more vulnerability records, a descriptive portion using a corresponding one or more of the vulnerability type classifications and the respective derived plurality of vulnerability characteristics;

deriving, for the each of one or more vulnerability records, one or more description characteristics using the descriptive portion classification;

generating one or more refined vulnerability parameters using the derived vulnerability characteristics and the derived one or more description characteristics;

storing processed vulnerability data incorporating the generated one or more refined vulnerability parameters to a second database assigned to the processed vulnerability data;

applying at least a portion of the processed vulnerability data to a task component to output one or more evaluation processes for a corresponding one or more processed vulnerability records;

executing the outputted one or more evaluation processes on a performance measurement component to output one or more evaluation metrics, wherein the one or more evaluation metrics comprises a comparison metric for a comparison between the respective one or more potential error indicators in the raw vulnerability data and the corresponding one or more of the vulnerability type classifications; and updating one or more parameters of the learning vulnerability processing model using the outputted one or more evaluation metrics;

receiving, by the computing apparatus from a user via the communication interface, a prompt for a vulnerability report;

generating, by the computing apparatus, the vulnerability report comprising one or more processed vulnerability records from the second database; and outputting, by the computing apparatus to the user via the communication interface, the vulnerability report comprising the one or more processed vulnerability records.

9. The method of claim 8, wherein the processing of the raw vulnerability data is initially executed in a recursive training process for the learning vulnerability processing model, starting with the derived plurality of vulnerability characteristics from the raw vulnerability data using the learning document profiling model, to generate the one or more refined vulnerability parameters, the generated one or more refined vulnerability parameters from one or more executions of the processing of the raw vulnerability data using the learning vulnerability data model acting as at least a portion of the raw vulnerability data for a next iteration, until the one or more evaluation metrics meets a predetermined threshold, wherein one or more of the vulnerability types and descriptive portion associated with the raw vulnerability data is updated based on the one or more refined vulnerability parameters.

10. The method of claim 9, wherein the recursive training process is executed for 100 iterations per 1000 vulnerability records.

11. The method of claim 8, wherein the learning vulnerability processing model comprises a neural network-based architecture with one or more components for respective one or more of vulnerability record structure learning and vulnerability type ID learning.

12. The method of claim 8, wherein the comparison metric relates to one or more of a false positive finding, a repeated item, and an inaccurate finding assignment.

13. The method of claim 12, wherein a threshold for the one or more evaluation metrics is equal to or greater than 70% for the comparison metric.

14. The method of claim 8, wherein the vulnerability report excludes at least one of a false positive finding, a repeated item, and an inaccurate finding assignment.

* * * * *